July 31, 1951     W. F. BUTLER ET AL     2,562,445

TRANSFUSION EQUIPMENT

Filed Feb. 21, 1947

INVENTORS
WILLIAM F. BUTLER
FRED A. CUTTER

BY Mellin & Hanscom

ATTORNEYS

Patented July 31, 1951

2,562,445

UNITED STATES PATENT OFFICE 2,562,445

TRANSFUSION EQUIPMENT

William F. Butler and Fred A. Cutter, Oakland, Calif., assignors to Cutter Laboratories, Berkeley, Calif., a corporation of California Application February 21, 1947, Serial No. 730,008

3 Claims. (Cl. 128—214)

This invention relates in general to equipment for use in giving a blood transfusion to a patient.

Presently it is the practice to collect the blood of a donor in a flask containing a blood non-coagulant such as sodium citrate and then, when the occasion arises, to transfer this blood through a drip meter and filter to a patient. A filter is deemed to be a highly desirable expedient for, in spite of the sodium citrate, coagulation of the blood sometimes occurs and it is essential that no coagulated blood be delivered to the patient.

There are two objections to the equipment now in use. In the first place, blood is delivered to the filter and drip meter through a nipple of a diameter of necessity so small that it can be easily plugged by a small clot of blood. In the second place, the filter per se is designed as a permanent part of the equipment and therefore must be washed and sterilized after each use.

In general, the object of this invention is the provision of a disposable filter assembly designed to be inserted into a flask through the elastomer stopper thereof and to filter the blood through an extended area prior to the passage of the blood through any restricted nipples or tubes, said assembly constituting a modification of the assembly disclosed in our co-pending application, Serial Number 728,680, filed on February 14, 1947, now Patent No. 2,528,737.

More specifically the object of this invention is the provision of a filter assembly arranged to be forced through the stopper of a transfusion flask and which comprises a spear-head mounted on the upper end of a section of wire, a form-sustaining filter stocking suspended from said spear-head and a rigid sleeve slidably disposed over said stocking.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings.

Figure 1:
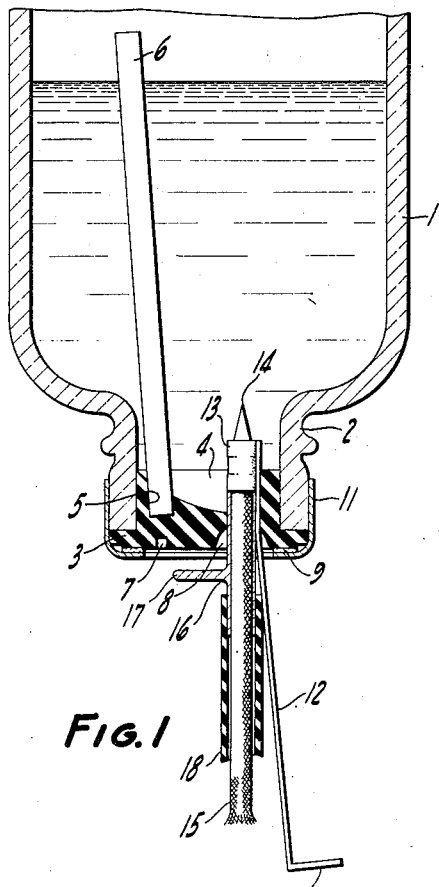
Fig. 1 is a vertical mid-section of an inverted transfusion flask and filter assembly embodying the objects of our invention, the filter assembly being shown in an intermediate position.
Figure 2:
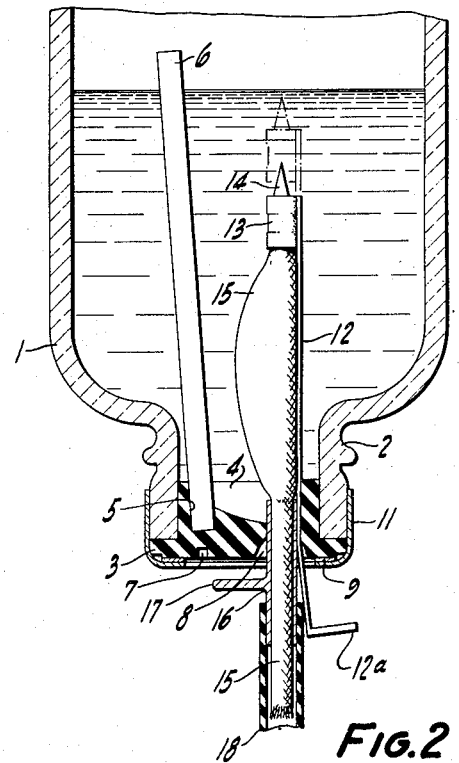
Fig. 2 is a section similar to that illustrated in Fig. 1 but with the filter assembly shown in its operative position.

As shown in Figs. 1 and 2, our filter assembly is arranged to be used in conjunction with a transfusion flask, including a body 1 and a neck 2. Closing the neck of the flask is a flanged elastomer stopper 3, provided on its inner face with a blood clot sump 4 and a bore 5 for the reception of an air eduction tube 6. Provided on the outer face of the stopper 3 is a recess 7 in alignment with the eduction tube 6 and a recess 8 overlying the sump 4. Disposed over the outer end of the stopper 3 is a foil disc 9, and sealing this disc to the stopper and to the neck of the flask is a conventional two-piece cap 11, the central portion of which can be readily torn away when it is desired to gain access to the flask.

Figure 3:
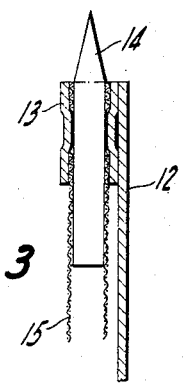
Fig. 3 is an enlarged fragmentary section of the spear-head, operating wire and filter stocking more generally shown in Figs. 1 and 2.

As shown in Figs. 1, 2 and 3 our blood filter assembly includes a section 12 of resilient wire serving as an operating rod and formed at its lower end with a lateral finger grip extension 12a. Fastened to the upper end of the rod 12 is a collar 13 and accommodated within this collar is a spear-head 14 and the upper end of a form-sustaining filter stocking 15. These three elements are made integral by crimping the central portion of the collar over the stocking and the spear-head. Conveniently the stocking is woven from glass filaments and should of course be inert with respect to blood fractions. Slidably disposed over the stocking 15 is a collar or nipple 16 having an internal diameter somewhat smaller than the outer diameter of the collar 13 and provided intermediate its ends with a laterally extending finger or projection 17. Secured over the lower end of the nipple 16 is section of flexible tubing 18 arranged to carry a hypodermic needle at its free end for effecting an intravenous injection. The phrase "form sustaining" has been used to denote a filter stocking which when placed under compression as shown in Fig. 2 will retain its distended form rather than collapsing under its own weight as would be the case if a limp and non-resilient material were resorted to.

In the use of this assembly the spear-head 14 is introduced into the recess 8 of stopper 3 and forced through the stopper at this point, this being accomplished by gripping the nipple 16 below the projection 17 and moving it inwardly. After the assembly has been forced into the position shown in Fig. 1 with the upper end of the nipple 16 extending into the flask, the spear-head and stocking are moved upwardly to the dash-dot position shown in Fig. 2 by means of the rod 12 and its finger 12a. In this position the stocking is of uniform diameter throughout its length just as shown in Fig. 1. This having been done the rod is pulled downwardly to make the assembly assume the full line position shown in Fig. 2. Due to the frictional engagement between the stocking and the nipple 16, the lower end of the stocking is held against downward movement thereby causing a lateral distension of that portion of the form-sustaining stocking extending between the nipple and the spear-head. This portion of the stocking therefor provides an extended filtering area through which the blood content of the flask must pass on its way through its lower restricted end into the tubing 15. Since the lower end of the distended portion of the stocking 15 is accommodated with the stopper sump 4, substantially the entire contents of the flask is available for use. Since our filter assembly is of simple construction and can be made very economically it need be used only once and then thrown away, thereby avoiding the inconvenience and normal hazards resulting from the re-use of equipment of this kind and relieving the hospital attendants of the responsibility of sterilizing it prior to any such re-use.

We claim:

1. A device comprising: An upstanding wire provided at its lower end with a laterally extending finger grip; a spear-head mounted on the upper end of said wire; a form-sustaining filter stocking secured to said spear-head and depending therefrom, said stocking being closed at its upper end and open at its lower end; and a substantially rigid sleeve slidably disposed over said stocking and provided intermediate its ends with a laterally extending finger.

2. A device for use in connection with blood transfusion equipment comprising: an upstanding spear-head; an elongated filter stocking secured to and depending from the base of said spear-head, the upper end of said filter stocking being closed and its lower end being open; a manipulating wire secured at its upper end to and depending from said spear-head; and a nipple surrounding said filter stocking and slidable thereon.

3. A device for use in connection with transfusion equipment comprising: an upstanding spear-head; an elongated filter stocking disposed over the base of said spear-head and depending therefrom, said filter stocking being secured to said spear-head by a collar crimped thereon; a manipulating wire fastened to and depending from said collar in parallelism with said spear-head, said wire being external and immediately adjacent to said filter stocking; and a nipple surrounding said filter stocking, the outer diameter of said nipple being substantially equal to the outer diameter of said collar.

WILLIAM F. BUTLER.
FRED A. CUTTER.

REFERENCES CITED

The following references are of record in the file of this patent:

UNITED STATES PATENTS

| Number | Name | Date |
|---|---|---|
| 170,124 | Spicer | Nov. 16, 1875 |
| 360,094 | Neitsch | Oct. 7, 1884 |
| 785,125 | Shafter | Mar. 21, 1905 |
| 796,910 | Herman | Aug. 8, 1905 |
| 1,097,876 | Pruyn | May 26, 1914 |
| 1,704,634 | Snider | Mar. 5, 1929 |
| 2,212,318 | Gee | Aug. 20, 1940 |
| 2,341,114 | Novak | Feb. 8, 1944 |
| 2,354,623 | Tietig | July 25, 1944 |